US005680403A

United States Patent [19]

Riello et al.

[11] Patent Number: 5,680,403

[45] Date of Patent: Oct. 21, 1997

[54] MULTIPLEX SERIAL DATA COMMUNICATIONS WITH A SINGLE UART FOR A POSTAGE METER MAILING MACHINE SYSTEM

[75] Inventors: Christopher S. Riello, Hamden; Edilberto I. Salazar, Brookfield; Richard P. Schoonmaker, Wilton, all of Conn.

[73] Assignee: Pitney Bowes Inc., Stamford, Conn.

[21] Appl. No.: 572,321

[22] Filed: Dec. 14, 1995

[51] Int. Cl.$^6$ .......... H04J 3/00

[52] U.S. Cl. .......... 370/532; 364/464.02

[58] Field of Search .......... 370/85.1, 112, 370/532, 537; 364/464.02

[56] References Cited

U.S. PATENT DOCUMENTS

| | | | |
|---|---|---|---|
| 4,455,647 | 6/1984 | Gueldner | 370/62 |
| 4,766,418 | 8/1988 | Dowsett et al. | 340/365 R |
| 5,123,091 | 6/1992 | Newman | 395/200 |
| 5,331,538 | 7/1994 | DiGiulio et al. | 364/464.03 |
| 5,334,974 | 8/1994 | Simms et al. | 340/990 |
| 5,437,010 | 7/1995 | Blackman et al. | 395/161 |
| 5,493,106 | 2/1996 | Hunter | 235/375 |
| 5,552,991 | 9/1996 | Lee et al. | 364/464.02 |

*Primary Examiner*—Douglas W. Olms
*Assistant Examiner*—Min Jung
*Attorney, Agent, or Firm*—Angelo N. Chaclas; Charles G. Parks, Jr.; Melvin J. Scolnick

[57] ABSTRACT

A postage meter mailing machine includes a multiplex serial data communication system for providing communication between the postage meter mailing machine and a plurality of internal and external devices. Each device can generate and receive serial messages at a respective device communication port. The mailing machine includes a controller, a UART controller module responsive to control signals from the controller, a message buffer in bus communication with the UART controller and a communication multiplexer. The communication multiplexer provides single channel communication with the UART controller module and selectively with one of a number of external communication ports. The communication multiplexer is responsive to control signals from the controller for establishing a communication path between the UART controller module and the selected one of communication ports over the single channel communication and sequentially alternating the communication path between each of the communication ports. Each communication port of the communication multiplexer is directed to a respective one of the device communication ports. The UART controller module can determine whether a serial message data is presented at a respective one of the communication ports and maintaining communication between that communication port and the single channel communication. Messages are directed to and from a buffer until the messaging is completed in the message buffer. When the messaging is complete, the communication multiplexer resumes its cycling between the various communication ports.

7 Claims, 4 Drawing Sheets

MULTIPLEX SERIAL DATA COMMUNICATIONS WITH A SINGLE UART FOR A POSTAGE METER MAILING MACHINE SYSTEM

BACKGROUND OF THE INVENTION

The present invention relates to real time machine control systems and, more particularly, to a real time machine control system particularly suited for the control of a postage meter mailing machine system.

A known postage meter mailing machine system includes a mailing machine which operates under the control of a microcontrol system. The system also includes a meter vault and a printing unit detachably mounted to the mailing machine. The meter vault and printing unit have a respective microcontrol system for controlling their independent operation. The meter vault, printing unit and mailing machine are interconnected through a printer interface for the purpose of providing electrical communication for serial communications between the units. It is conventional for each device, i.e., the meter vault, printing unit and mailing machine, to have a respective universal asynchronous receive transmit (UART) unit to enable serial communication between the several units. The mailing machine microcontroller is intended to communicate with the meter vault and printer unit through the printer interface and, also, with external devices, such as, a user interface and a scale. To promote communication between the mailing machine microcontroller, the user interface, a scale and external devices, it is conventional to require each unit to have its own UART system which resides on the system bus of the mailing machine controller.

SUMMARY OF INVENTION

It is an object of the present invention to present a multiplexed serial data communication channel system for the mailing machine microcontroller system which utilizes a single UART module to enable multiple unit communication.

More particularly, a postage meter system in accordance with the present invention includes a base unit, more commonly referred to as a mailing machine, which serves as a platform for the meter vault and digital printing unit. The base includes a microcontrol system which is responsible for controlling a number of system operations. The base unit also includes an integrated scale system which serially communicates with the microcontrol system of the mailing machine. The mailing machine microcontrol system is required to provide machine control as well as interface control and communication with external devices, such as, a personal computer. The meter vault includes a microcontrol system for keeping the funds accounting system. In addition, the digital printer includes a microcontrol system for controlling the printing units and decrypting messages from the meter vault to enable secure printing.

The mailing machine microcontrol system utilizes a single UART module in communication over a common channel to a communication multiplexer from the mailing machine microcontrol system. The communication multiplexer is in independent communication with the keyboard/display of the mailing machine, the printer interface, the scale interface and an external input-output interface over respective communication channels. Each channel is enabled periodically to determine if communication is to be established between the mailing machine microcontrol system and the respective units.

DETAILED DESCRIPTION OF THE PREFERRED EMBODIMENT

Figure 1:
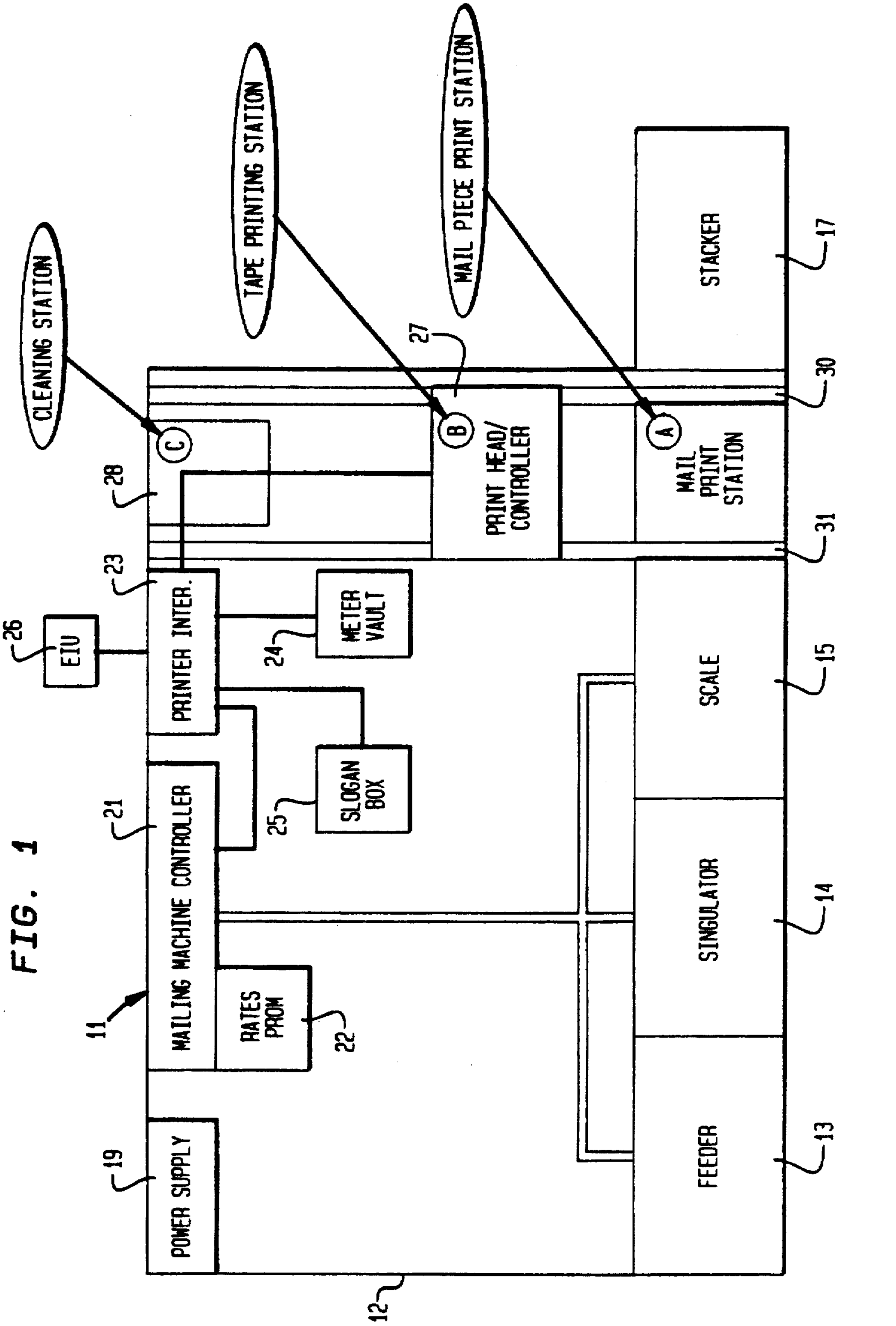
FIG. 1 is schematic of a mail processing system in accordance with the present invention.

Referring to FIG. 1, the postage meter system, generally indicated as 11, includes a mailing machine base 12. The mailing machine base 12 is of any suitable known design and, in the preferred embodiment, includes a feeder 13, singulator 14 and scale 15 positioned serially along a mail flow path. Following the scale 15 is a print station at location A which is followed by a stacker 17. Any suitably designed feeder 13, singulator 14, scale 15 and stacker 17 may be used. The operation of the respective feeder 13, singulator 14, printer transport and envelope transport (not shown) is under the control of a mailing machine microcontroller 21. Power is provided by a conventional power supply 19. It should be appreciated that the mailing machine microcontroller 21 is responsible for providing real time motor control function to motors 81 and 83 (refer to FIG. 3), in addition, non-real time control for such machine functions as keyboard and display, unsecured departmental accounting (not shown) and external communications. As depicted in FIG. 1, a rates memory (PROM 22) is detachably mounted to the mailing machine microcontroller 21 to provide rate information to the mailing machine microcontroller 21 in any suitable conventional manner.

Also, housed in the mailing machine is a printer interface 23, graphics interface 25, meter vault 24 and print head/controller 27, hereafter referred to as print head 27. The print head 27 is mounted to a pair of rails 30 and 31 by any suitable means to be positionable by any conventional means, such as, by a motor (not shown), between a first position "A" which is the print position, a second position "B" which is a tape print position, and a third position "C" which is a cleaning position. At position "C", the print head 27 is brought into contact with a nozzle cleaning system of any suitable design such that, for example, when ink jet print technology is utilized by the print head 27, the nozzles may by cleaned. The positioning of the print head 27 along the rails 30 and 31 is under the control of the mailing machine microcontroller 21.

Also, the mailing machine base 12 includes provisions for allowing the external interface of an external interface unit (EIU 26) to the printer interface 23 by any conventional means. The EIU 26 provides additional microprocessor functionality to the system 11 utilizing any suitable method.

Figure 2:
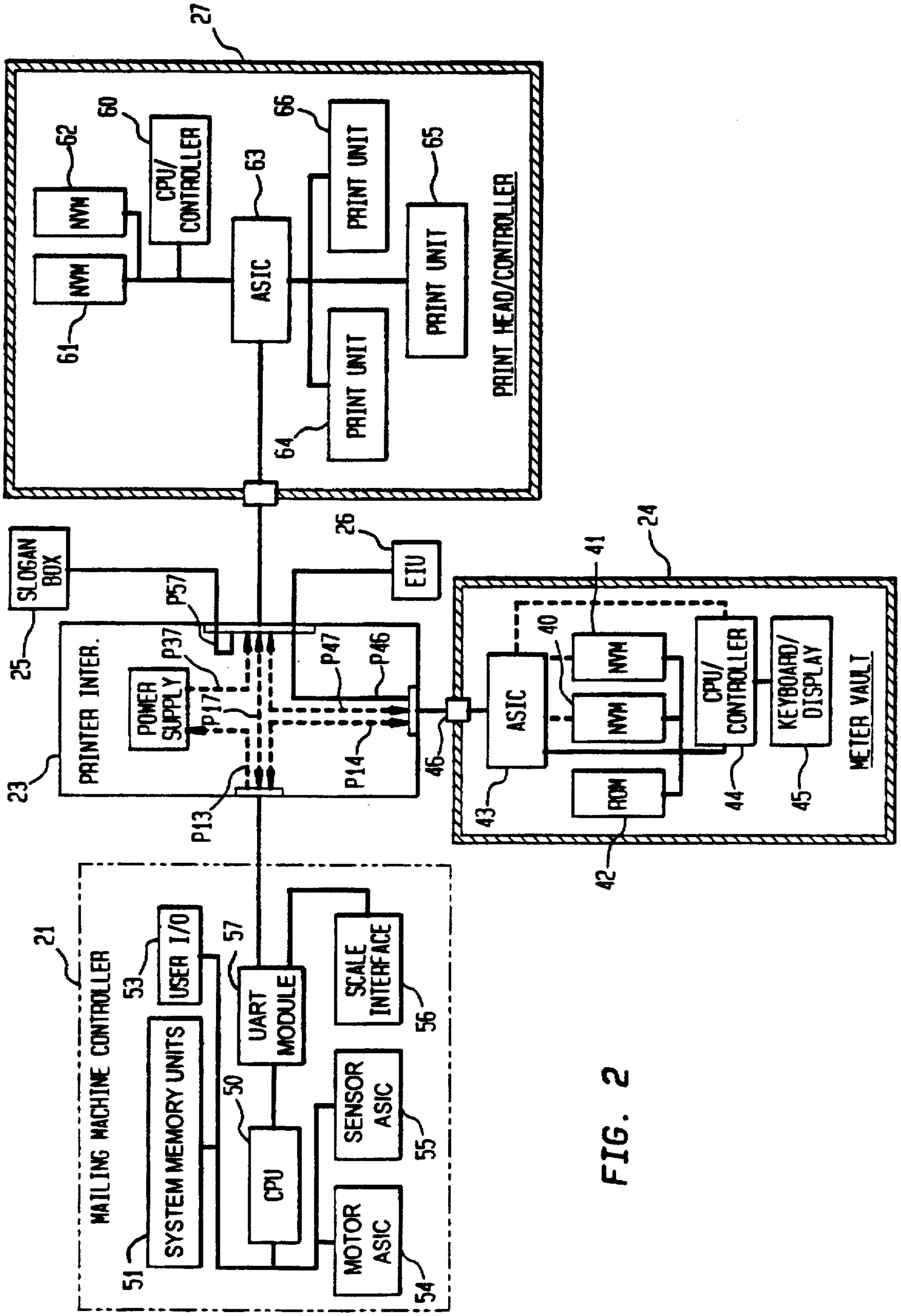
FIG. 2 is a schematic of the microcontrol system for a mailing machine in combination with a meter vault, printer interface and printer particularly suited to the present invention.

Referring to FIG. 2, the meter vault 24 includes a funds accounting memory 40 and 41, program memory 42, application specific integrated circuit (ASIC) 13, CPU controller 44, and keyboard/display 45. As more specifically described subsequently, the ASIC 43 provides for two RS-232 communication ports 46 for facilitating communications with the mailing machine microcontroller 21.

The communication ports 46 are modified to include an extra pin for receiving DC power from the mailing machine.

It should be appreciated that the keyboard/display 45 provides an operator or postal agent a means of recharging the funds accounting registers of the accounting memory 40 and 41 through the keyboard in any suitable conventional manner.

The mailing machine microcontroller 21, among other things which will be described in more detail subsequently, includes a controller CPU 50, system memory units, generally indicated as 51, user input/output interface 53, motor control ASIC 54, and sensor control ASIC 55. Also, provided is a scale interface 56 and UART interface 57. The UART interface 57 is provided to facilitate communication between the mailing machine controller 21 and the other system units 23, 24, 25, 26 and 27.

The print head 27 is comprised of a CPU controller 60, nonvolatile memory units 61 and 62, ASIC 63 and print units 64, 65, 66. In the preferred embodiment it is contemplated to use multiple ink jet printing units.

Meter vault 24 communications to the print head 27 are routed through the printer interface 23 along communication path P47. Communications path 47 is also used to select inscriptions and slogans in conjunction with the graphics interface 25. A printer interface path P46 is provided for electrical communication with the EIU 26. As aforenoted, the EIU 26 represents an external unit which can be attached to the meter vault 24 to provide enhanced capability to the meter vault 24 when the meter vault 24 is used in combination with a reduced featured mailing machine.

The printer interface 23 serves as a junction board for the mailing machine controller 21, meter vault 24, print head 27 and graphics interface 25. By providing specific communication paths P13, P14, P17, P37, P46, P47, P57 within the printer interface 23, the individual subsystems can be isolated in such a manner to remove the necessity for interdependent security measures.

The graphics interface 25 stores graphics images representing the fixed part of the standard indicia (e.g., the eagle printed on US mail), low-value indicia, permit mail indicia, town circle (where appropriate), inscriptions, and slogans. It also stores the fonts for printing the variable data on the mail piece.

The print head 27 prints the indicia including postage amount, digital tokens, piece count, and date as well as an optional inscription and slogan on each mail piece. The fixed part of the image, fonts for the variable parts of the image, and inscription bit-maps are programmed into the print head's NVMs 61 and 62 when the print head 27 is first installed in the mailing machine 17. The meter vault 24 will send a message to the print head 27 indicating the format of the town circle. The print head 27 obtains the town circle information as either a text string from the meter vault 24 or a bit map from the graphics interface 25 and programs its NVMs 61 and 62 with the data. For each mail piece, the meter vault 24 transfers the variable indicia information, such as, the postage amount, digital tokens, meter serial number, and piece count, to the print head 27. The print head controller 60 programs registers (not shown) in the ASIC 63 with this information. When the mailing machine 21 commands the print head 27 to print, the ASIC 63 combines the fixed and variable parts of the image for printing by the print units 64, 65 and 66 utilizing any suitable technique.

Figure 3:
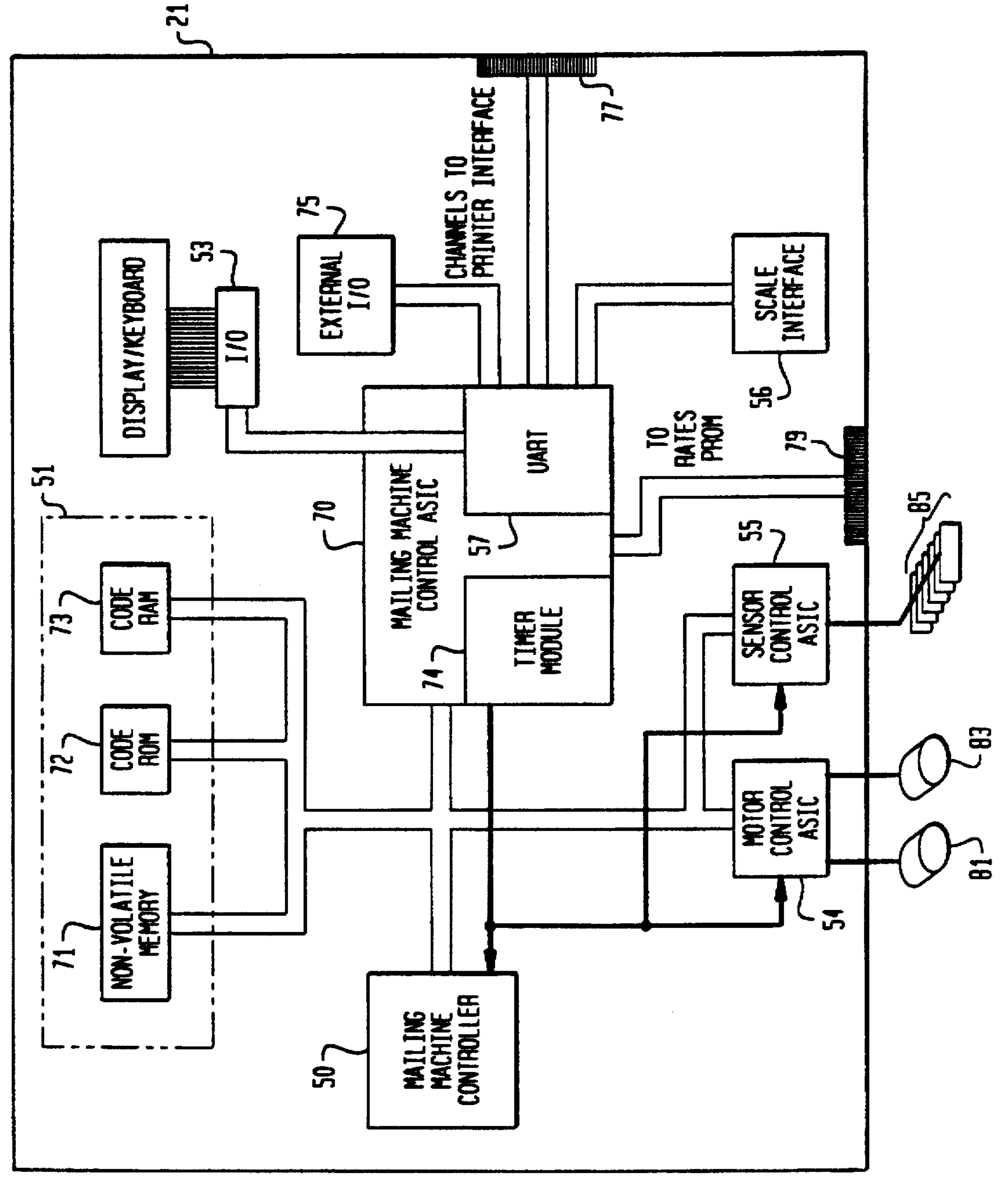
FIG. 3 is expanded schematic of the mailing machine microcontrol system in accordance with the present invention.

Referring now more particularly to FIG. 3, the mailing machine controller 21, is comprised of a controller CPU 50 in bus communication with a control ASIC 70, the motor control ASIC 54, the sensor control ASIC 55 and memory units 71 to 73 which collectively form the memory 51. The control ASIC 70 includes a number of control modules which perform a number of system functions. Serial communication is provided by the UART module 57 and the timer module 74. The UART module 57 is in direct communication with the scale interface 56 and, in addition, an external I/O 75 and a dual channel printer interface connector 77 are provided to facilitate communications with the printer interface 23 as described above. Also, provided is a connector 79 which is provided to allow connection of the rates prom 22 to the control ASIC 70.

In the preferred embodiment, the mailing machine base 12 includes two motors 81 and 83 which are provided as prime movers for the various mailing machine stations. These motors 81 and 83 are in electrically responsive communication with the motor ASIC 54 to control the drive output of the motors 81 and 82. Also provided are a plurality of sensors 85 which are positioned at various points along the mail path to provide sensor input to the sensor ASIC 55 which information is processed for the microcontroller 50 for use by the motor control algorithms in a known manner. The control ASIC 70 includes a timer module 47 which provides timing signals to the controller 50, motor control ASIC 54 and sensor ASIC 55.

Figure 4:
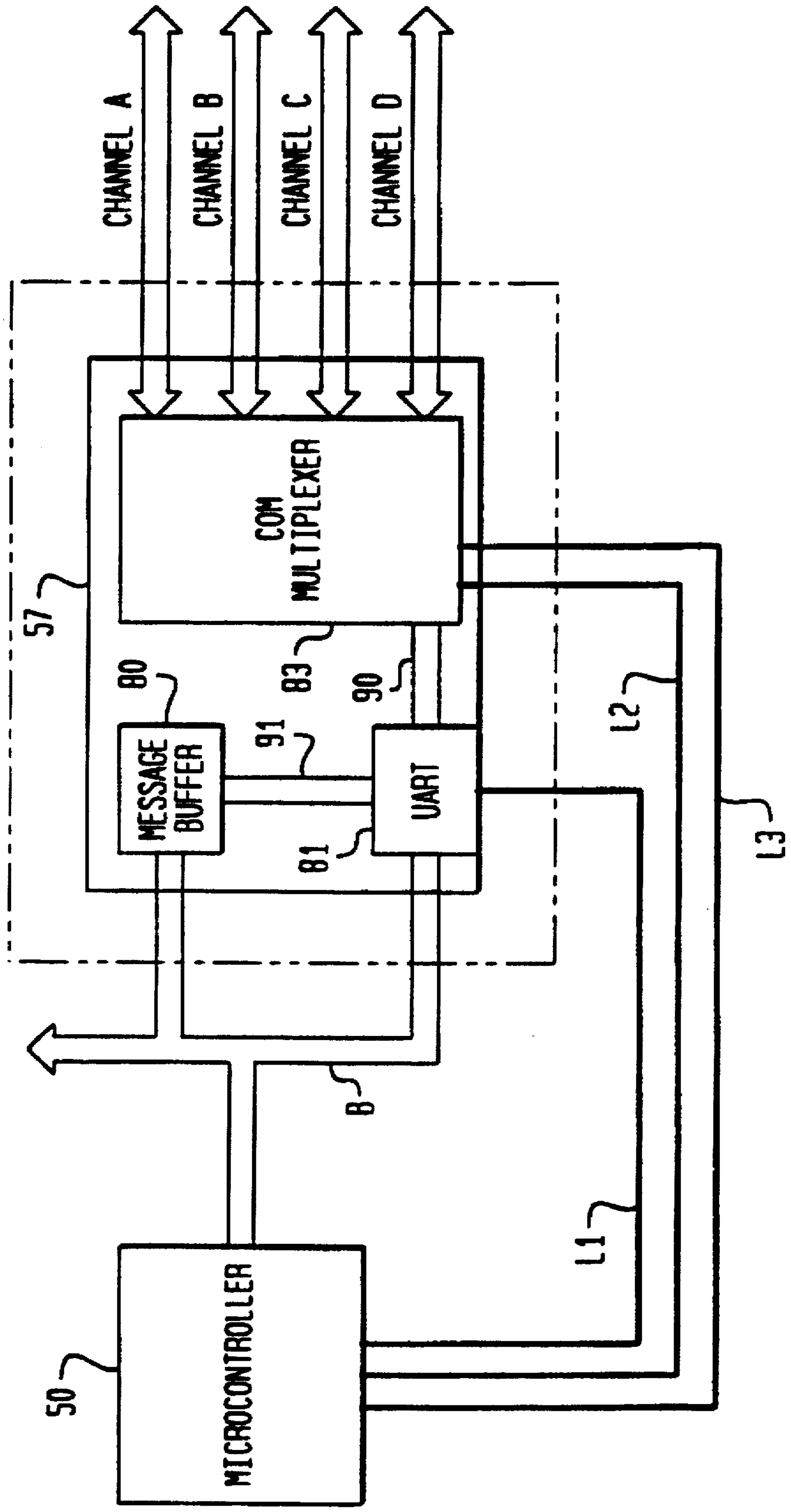
FIG. 4 is a schematic of the mailing machine microcontrol system UART communication controller.

Referring to FIG. 4, the UART module 57 includes a message buffer 80 in communication with the internal bus B and a conventional UART controller 81 in communication with the internal bus B. A communication multiplexer 83 is in communication with the UART controller 81 over an internal channel 90. The communication multiplexer has four communication ports for receiving respective channels A through D. The message buffer 80 is also in communication with the UART control module 81 via an internal channel 91. The UART controller 81 is responsive to control signals from the controller CPU 50 via control line L1 to enable the UART controller 81. The communication multiplexer 83 is responsive to control signals from the controller CPU 50 via control lines L2 and L3 for selectively engaging the respective channel ports A, B, C or D. The channel ports A through D are respectively connected to the keyboard/display I/O 53, external I/O 75, meter vault 24, printer 27, and scale interface 56. The microcontroller 50 is programmed, in response to timer 74 to periodically cycle the control signal in L2 and L3 causing sequential engagement of ports A, B, C and D.

Consequently, the UART controller 81 is connected to only a single serial device at a time, and can both send and receive messages to and from the selected device. Messages are formatted for transmission by building them in the message buffer 80, and transmitting the message string to the selected device. Likewise, messages received from the selected serial device are saved in the message buffer 80 for decoding once the entire message string has been received.

The external devices each contain their own UART, and contain a microprocessor programmed to either transmit messages only in response to receiving a message from the UART module 57, or will re-transmit change of status messages if the transmitted message is not acknowledged within a predetermined amount of time. This action insures that any messages missed by the controller CPU 50 while it is connected and communicating with another serial device will eventually be properly received by the communication multiplexer 83 when that particular device is selected by the microcontroller.

The external serial devices can be programmed to either be the same format and BAUD rate or different from each other. The mode of the UART controller 81 can be switched, using conventional techniques, along with the serial communication channel. This feature can be used to link together two devices with different serial port characteristics. This is possible since each message received is placed in an internal message buffer. The message may then be redirected to another external serial device by switching the multiplexer port, changing the UART mode if required, and transmitting the intercepted message to the selected serial device.

The messages contain embedded message type codes, which are used to determine the destination. Most messages will be between the external devices and the microcontroller 50. Some messages, however, will be redirected to another external device. An example of this will be when the keyboard/display panel is used to query the meter vault 24, which will operate together as a self contained electronic postage meter.

Generally, every message is formatted depending upon the origin of the message. The communication multiplexer 83 includes conventional means for translating the messages from the format of the originating device to the format of the destination device.

The invention is here described in the preferred embodiment and should not be viewed as limiting. The scope of the invention is defined by the appendix claims.

What is claimed is:

1. A multiplex serial data communication system for a postage meter mailing machine for providing communication between said postage meter mailing machine and a plurality of first means, said first means for respectively generating and receiving serial messages at a respective communication port, said mailing machine having operation programs, memory means for storing operation programs and a microcontroller for controlling a plurality of functions in response to said operation programs, said multiplex serial communication system comprising:

said microcontroller having:

a controller, said controller having signal means for generating a plurality of control signals in accordance with said operation programs;

a UART controller module responsive to first ones of said control signals from said controller;

a message buffer in bus communications with said UART controller and said controller;

a communication multiplexer in communication with said UART controller module and a plurality of external communication ports, said communication multiplexer being responsive to second ones of said control signals from said controller for establishing a communication path between said UART controller module and said respective one of said external communication ports and sequentially and periodically alternating said communication path between each of said external communication ports and said UART controller module;

means for providing bidirectional communication between one of said external communication ports and a respective one of said external communication ports;

said UART controller module having means for determining whether a message is presented at a respective one of said external communication ports and maintaining communication between said external communication port and said UART controller module and directing said message to said buffer until said message is completely stored in said message buffer.

2. A multiplex serial data communication system for a postage meter mailing machine system as claimed in claim 1 further comprising said message buffer having means responsive to third ones of said control signals for allowing said controller to access and receive said message in said message buffer.

3. A multiplex serial data communication system for a postage meter mailing machine system as claimed in claim 2 further comprising said controller having means for generating said message for a respective one of said first means and placing said message in said message buffer, and generating fourth ones of said control signals for causing said communication multiplexer to establish a communication path between said UART controller module and said first means intended to receive said message.

4. A multiplex serial data communication system for a postage meter mailing machine system as claimed in claim 3 further comprising said controller having means for generating a response message for said respective one of said first means and storing said response message in said message buffer, and generating fifth ones of said control signals for causing said communication multiplexer to establish a communication path between said UART controller module and one of said first means.

5. A multiplex serial data communication system for a postage meter mailing matching system as claimed in claim 4 wherein said multiplex controller further comprises said messages having a message format depending on said message origination, and message formatting means for translating said message format of said respective one of said first means to said message format of said controller when said message originates with said respective one of said first means and from said message format of said controller to said message format of said respective first means when said message originates from said controller.

6. A multiplex serial data communication system for a postage meter mailing machine system as claimed in claim 4 wherein said response message is the same as said message directed to a different one of said communication ports.

7. A multiplex serial data communication system for a postage meter mailing machine system as claimed in claim 6 wherein said multiplex controller further comprises said messages having a message format depending on said message origination, and message formatting means for translating said message format of said respective one of said first means to said message format of said controller when said message originates with said respective one of said first means and from said message format of said controller of said message format of said respective first means when said message originates from said controller.

* * * * *